US006735540B2

(12) United States Patent
Pedrazzini et al.

(10) Patent No.: US 6,735,540 B2
(45) Date of Patent: May 11, 2004

(54) SIGMA-DELTA RAMP LOADING CALIBRATION

(75) Inventors: Giorgio Pedrazzini, Rancho Santa Margarita, CA (US); Chee Keong Chow, Laguna Niguel, CA (US)

(73) Assignee: STMicroelectronics, Inc., Carrollton, TX (US)

(*) Notice: Subject to any disclaimer, the term of this patent is extended or adjusted under 35 U.S.C. 154(b) by 134 days.

(21) Appl. No.: 09/967,059

(22) Filed: Sep. 28, 2001

(65) Prior Publication Data

US 2003/0065469 A1 Apr. 3, 2003

(51) Int. Cl.[7] ............................................. G11B 5/596
(52) U.S. Cl. ............................ 702/79; 702/85; 702/89; 702/94; 702/106; 702/107
(58) Field of Search ........................... 702/85–107, 79, 702/FOR 154–157, FOR 160–161; 360/75, 23–29, 901, 78.04, 78.05, 78.12, 78.09; 388/928.1; 318/254, 560, 138, 799, 810

(56) References Cited

U.S. PATENT DOCUMENTS

| 5,768,045 | A | * | 6/1998 | Patton et al. ............ 360/78.04 |
| 5,781,362 | A | * | 7/1998 | Bang ........................ 360/78.05 |
| 6,011,668 | A | * | 1/2000 | Choi ........................ 360/78.06 |
| 6,040,671 | A | * | 3/2000 | Brito et al. ................. 318/603 |
| 6,229,663 | B1 | * | 5/2001 | Yoneda et al. ................. 360/75 |
| 6,363,214 | B1 | * | 3/2002 | Merello et al. ............. 318/109 |
| 6,496,319 | B1 | * | 12/2002 | Kusumoto et al. ............ 360/75 |
| 2002/0033687 | A1 | * | 3/2002 | Abe et al. .................... 318/560 |
| 2002/0070696 | A1 | * | 6/2002 | Gotou ........................ 318/254 |

OTHER PUBLICATIONS

International Business Machines, "IBM hard disk drive load/unload technology," May 1999.
The PC Guide, Head load/unload Technology, Apr. 17, 2001.

* cited by examiner

*Primary Examiner*—Marc S. Hoff
*Assistant Examiner*—Carol S Tsai
(74) *Attorney, Agent, or Firm*—Lisa K. Jorgenson; William J. Kubida

(57) ABSTRACT

A continuous automatic calibration system and apparatus using a delta-sigma modulation technique. A first time duration is set. The first time duration is a length of time in terms of clock counts for a calibration procedure. Then, a second time duration occurring during the first time duration is measured. The second time duration is a length of time in terms of clock counts that a counter is operational. A multiplying factor is determined by dividing the first time duration by the second time duration.

20 Claims, 6 Drawing Sheets

SIGMA-DELTA RAMP LOADING CALIBRATION

BACKGROUND OF THE INVENTION

1. Field of the Invention

The present invention relates, in general, to driver circuits, and, more particularly, to an automatic calibration system and method for deriving the back electromotive force voltage by sigma-delta modulation.

2. Relevant Background

Switched power driver circuits are widely used to generate power suitable for driving loads such as motors. Switched power drivers turn on and off repetitively to supply regulated voltage or current in an efficient manner (i.e., with minimal switching loss). Switched power driver circuits are associated with driver circuits that control, for example, the magnitude (by means of the duty cycle of the on and off cycles), so as to supply a desired amount of power to a load. In a typical application, a power driver circuit is controlled by a system processor, often implemented as a microcontroller IC, that generates commands to the driver circuit. The driver circuit essentially turns on and off in a predefined sequence in response to the received commands. When on, the driver circuit supplies current to the load, and when off, the driver circuit cuts off current supply to the load.

Permanent magnet motor loads, such as VCM (Voice Coil Motor), act as a motor or a generator. As a motor, the load provides a motion as a response to a voltage or current input. Additionally, if the load is in motion, it can generate a back electromotive force voltage (VBEMF). VBEMF subtracts from the applied voltage such that the motor acceleration responds to the difference in the two voltages.

In a typical application, such as a VCM motor in a disk drive, the best performance in the head positioning servo system requires that the current in the motor be proportional to the servo controller command. This helps both the positioning of the head over the data track as well as moving the head from the track in an efficient manner.

Head position control is implemented by a servo control system. Early servo control systems for low density drives used open loop positioning using stepper motor technology. However, at higher densities closed loop solutions are required. Current disk drives, for example, obtain head position information directly from data contained on the disk surface. A track number, in the form of encoded binary data, is recorded at various locations about the disk surface and uniquely identifies each recording track on the disk. Servo position, in the form of sinusoidal burst signals staggered in position between adjacent tracks can be used to determine the position of the head with respect to a track centerline. The track number and servo burst are used to compute a position error signal (PES), which is fed into the electro-mechanical servo position system.

In a device driving a permanent magnet motor load such as a VCM, that is both switched mode and voltage mode, the resulting steady state output current to the load is directly proportional to the average voltage applied to the load terminals minus the $V_{BEMF}$. ($I_A=(V_{AVE}-V_{BEMF})/R_L$), where $R_L$ is the resistance of the motor load. In a voltage mode driver, the average applied voltage $V_{AVE}$ is proportional to the input command. The VCM generates $V_{BEMF}$ in proportion to its velocity. Therefore, for a step of command input, the current in the actuator will decrease as the VCM increases velocity. It is therefore desirable to cancel the voltage loss due to the coil resistance to keep the current applied to the actuator, $I_A$, proportional to the command.

Hard disks operate by having the read/write heads fly over the surface of the disk platters. However, this floating action occurs only when the platters are spinning. When the platters are not moving, the air cushion dissipates, and the heads float down to contact the surfaces of the platters. This contact occurs when the drive spins down, as soon as the platters stop spinning fast enough, and occurs again when the spindle motor is restarted, until the platters get up to speed. Each time the heads contact the surface of the platters, there is the potential for damage. In addition to friction on these sensitive components, dust can be created as the heads scrape off minute amounts of material from the platters.

Traditionally, most disk drives have operated in a Contact Start-Stop (CSS) mode, in which heads come to rest on the disk surface when the drive is turned off. During start-up, the heads slide in contact over the disk surface until the disks are spinning sufficiently fast. In order to prevent adhesion of the heads to a smooth disk surface, which could impact drive spin-up, disk surfaces have been textured (roughened) in a precision process. Texturing is performed either uniformly over the entire disk surface or locally in a specific zone at the inner diameter of the disk that is dedicated for starting and stopping. While such texturing techniques have been satisfactory in the past, today's higher areal density designs require a level of disk surface perfection beyond the texturing needed to support CSS operation.

In mobile systems, such as laptops and the like, power saving may be achieved by shutting down a disk drive whenever it is idling. Since extending battery life is such a great concern, the rate of performing a disk drive "park" in a mobile system far exceeds that of a desktop. Performing a CSS in a mobile system increases the wear and tear of the read/write head that ultimately leads to a shortening of the life span of a disk drive. Additional concerns of the mobile system are shock robustness and drive capacity. In consideration of those factors, CSS technology is no longer adequate in disk drive technology.

One possible solution in disk drive technology is the advancement of load/unload technology. In drives that use load/unload technology, a lifting mechanism removes each head from the disk surface prior to power-down and returns the heads to the disk surface only after a sufficient rotation rate has been reached on the next start-up. As a result, head-to-disk contact is significantly reduced, and disk damage from such contact is virtually eliminated.

In operation, instead of letting the heads fall down to the surface of the disk when the disk's motor is stopped, the heads are lifted completely off the surface of the disk while the drive is still spinning, using special ramps. Only then are the disks allowed to spin down. When the power is reapplied to the spindle motor, the process is reversed: the disks spin up, and once they are going fast enough to let the heads fly without contacting the disk surface, the heads are moved off the "ramps" and back onto the surface of the platters.

However, ramp-loading topology is susceptible to temperature induced parameter variations. The objective of the ramp-loading scheme is to be able to control the velocity of the actuator by measuring the back electromotive force voltage ($V_{BEMF}$) developed in the motor and using it for velocity feedback. As such, the voltage across the winding resistance ($R_{motor}$) 50 in the coil due to motor current must be cancelled out by means of circuit design. Unfortunately, winding resistance 50 is a function of temperature.

Therefore, the circuit implemented to cancel out the winding resistance 50 must be able to overcome this challenge.

FIG. 1 shows a prior art voltage feedback measurement circuit used in a typical ramp-loading circuit. The bemf op-amp 70 extracts both the $V_{bemf}$ developed in the voice-coil-motor 40 as well as the undesirable voltage drop across the winding resistance 50 in the motor, $R_m$. To cancel out the winding resistance 50, the voltage drop across the sense resistor 30, $R_s$ is extracted through a sense op-amp 60 and multiplied by a K factor. The resulting product is then summed with the op-amp's output voltage, $V_{bemf}$. This K value represents the ratio between $R_s$ and $R_m$. By choosing an appropriate K value, $V_{bemf}$ developed across the motor can be extracted.

As the voice-coil-motor heats up, the winding resistance also increases. The sense resistor's resistance increases at the same time, but at a different rate then the winding resistance due to the difference in temperature and temperature coefficient. Therefore, the previously determined K factor is no longer valid and a new value must be determined.

The existing methods for finding a K value require periodic calibration and updating. This periodic updating can be performed on the ramp, during track following or on the fly. Significantly, the activities of the disk drive are interrupted during any calibration operation. Precious firmware time is traded for updating the K value. Inevitably, this results in a compromise between the read/write time and the performance of the ramp-loading circuit.

SUMMARY OF THE INVENTION

Briefly stated, the present invention involves a method and apparatus for providing a continuous auto-calibration circuit in a hard disk drive system. In one aspect, a first time duration is set, wherein the first time duration is a length of time in terms of clock counts for a calibration procedure. Then, a second time duration during the first time duration is measured, wherein the second time duration is a length of time in terms of clock counts that a counter is operational. Finally, a multiplying factor is determined by dividing the first time duration by the second time duration.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF THE PREFERRED EMBODIMENTS

The present invention involves a continuous automatic calibration system and methodology in which a sigma-delta modulation technique is used to provide a reasonably accurate K factor. The sigma-delta modulation technique of the present invention is similar to the technique used in analog-to-digital converter (ADC). It is essentially a sampling of the analog signal of interest at a fixed frequency, but sampling beyond the bare minimum to achieve better accuracy. The technique may also be referred to as over-sampling.

The present invention is particularly described in terms of a disk drive system in which a permanent magnet motor load, such as an actuator or voice coil motor, is being driven. The system does not take up precious firmware time and provides a reasonably accurate K factor with minimum increment in die size.

Figure 2:
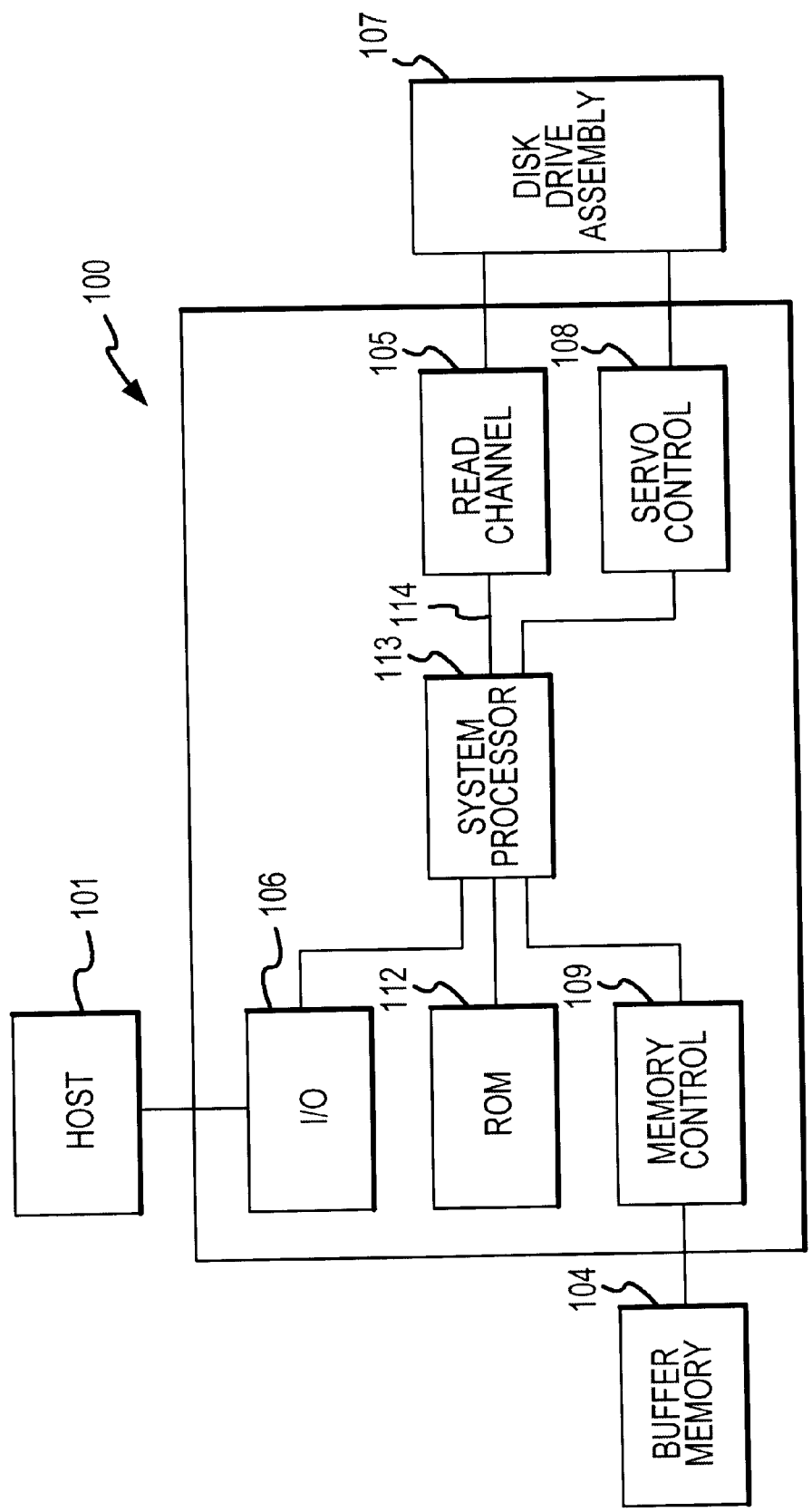
FIG. 2 shows in block diagram form a disk drive control system in which the present invention is implemented.

FIG. 2 illustrates in simplified form a drive system 100 in which the present invention is embodied. Disk drive system 100 includes a system processor 113 that processes requests and commands from a host computer 101 that direct the drive system to perform specific behavior involving disk drive assembly 107. Examples include reading and writing data to disk drive assembly 107, providing state information such as defect tables, error status, and the like. Disk controller unit 106 includes data processing capacity as well as memory in the form of ROM 112 and buffer memory 104 to generate responses to received commands and requests. The generated responses return data, state information, and/or error codes depending on the particular operation being performed.

Disk drive assembly 107 implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks, and voice coil motor (VCM) for positioning the read/write head electronics at specific locations with respect to the disk surface(s).

Servo control 108 generates drive signals that control the VCM and/or spin motors. These drive signals are in the form of precision current signals that drive the motors directly. In accordance with one aspect of the present invention, servo control 108 includes a voltage-mode driver and supplies the drive signals using a power drive circuit such as an H-bridge transistor configuration.

Host 101 typically comprises a data processing device such as a personal computer, server, workstation or the like that requires access to bulk data storage capabilities of disk drive assembly 107. Host 101 sends write commands and data via controller 106 to write data onto the disks as well as read commands to retrieve previously written data from disks within disk drive assembly 107. On both read and write operations the data transmitted from the host 101 to the disk controller 106 includes an indication of a specific location or set of locations on the disk drive assembly that contains the data that is to be accessed.

The data that is exchanged through disk controller 106 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection, and the like) to memory controller 109.

Figure 1:
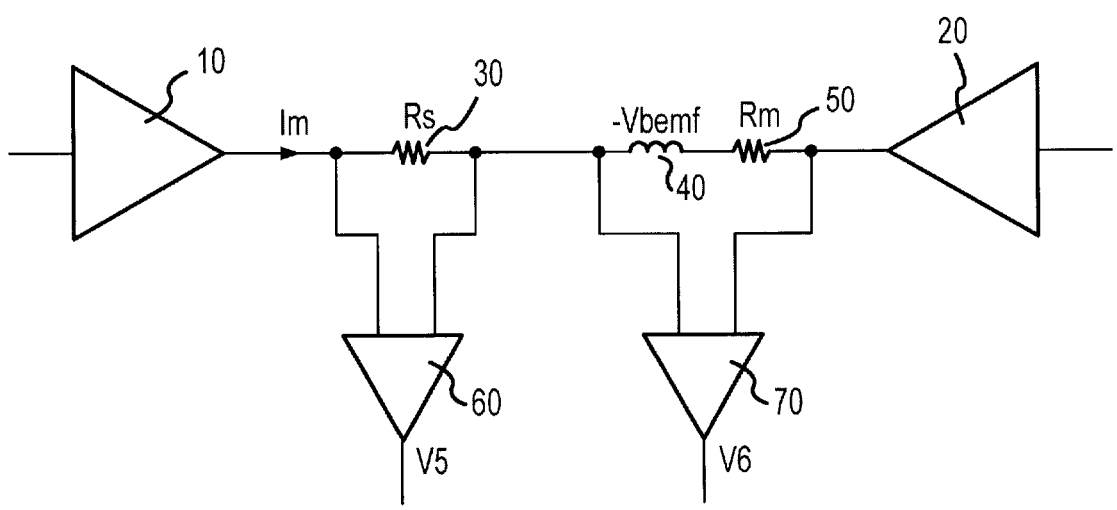
FIG. 1 shows a prior art voltage control loop (VCL) used in a ramp loading circuit.
Figure 3:
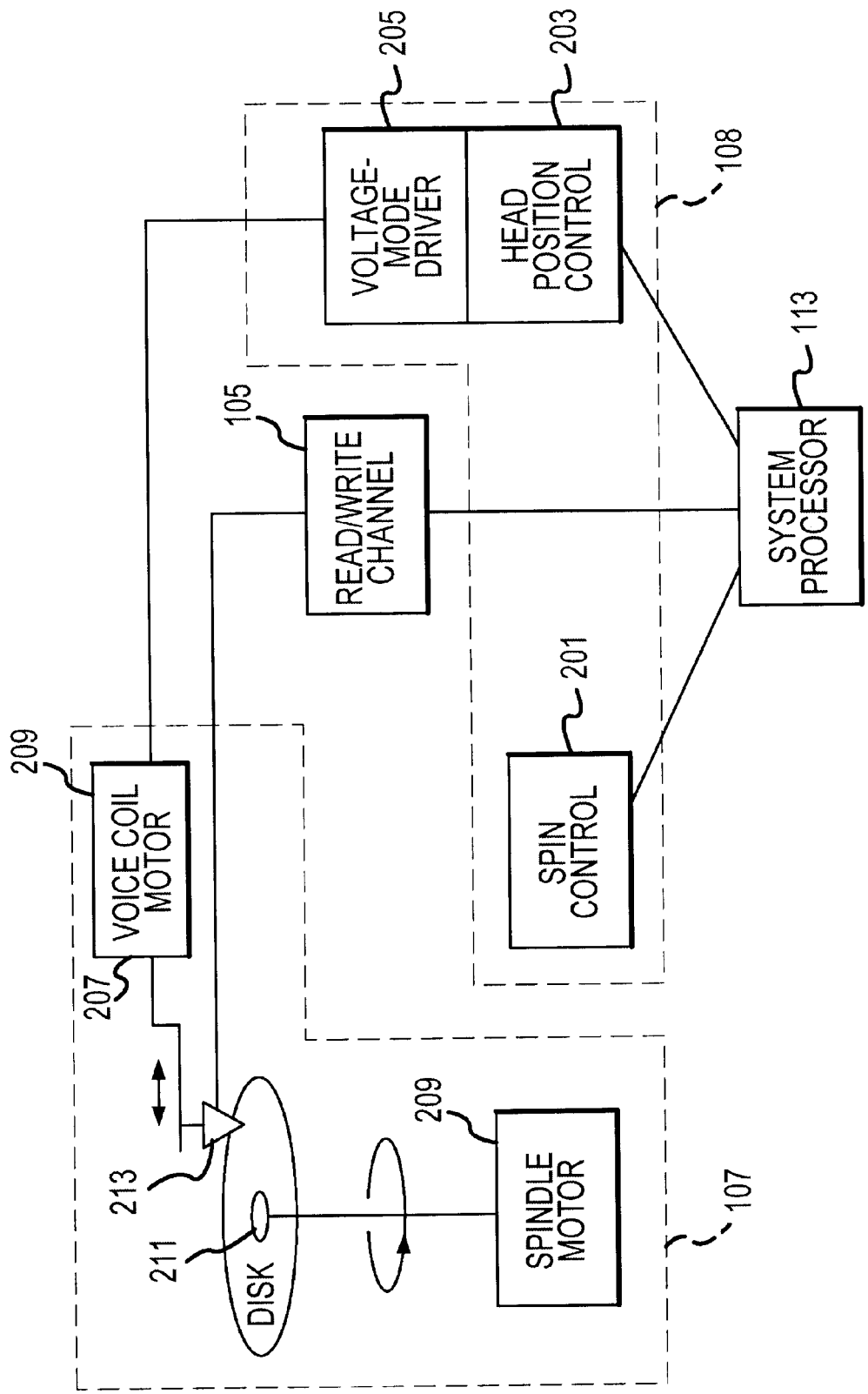
FIG. 3 shows a more detailed view of some of the components shown in FIG. 1.

FIG. 3 illustrates some of the components of FIG. 1 in greater detail. As shown in FIG. 2, servo control 108 includes spin control unit 201 that regulates the spin speed of spindle motor 209 in response to commands from system processor 113. Head position control unit 203 operates through voltage mode driver unit 205 to deliver controlled voltage signals in response to commands from system processor 113 to voice coil motor 207. These voltage signals cause voice coil motor unit 207 to move read/write head 213 into precision alignment with respect to the surfaces of disk 211. Although the voltage controlled driver configuration of the present invention is particularly applied to voice coil motor 207, it may be applicable to drive spin control unit 201 in certain applications.

Read channel circuit 105 communicates data and control information with the surface of disk 211. Control information such as servo control data, phase lock oscillator synchronization patterns, and servo bursts are encoded into portions of disk 211. This information is provided through read channel circuit 105 to system processor 113. System processor 113 uses this information to compute commands for spin control unit 201 and head position control unit 203. Due to the nature of a motor load, the computed commands will not result in ideal reactions, hence the computed commands are modified by head position control unit 203 and/or voltage mode driver 205 so as to compensate for the motor characteristics.

Figure 4:
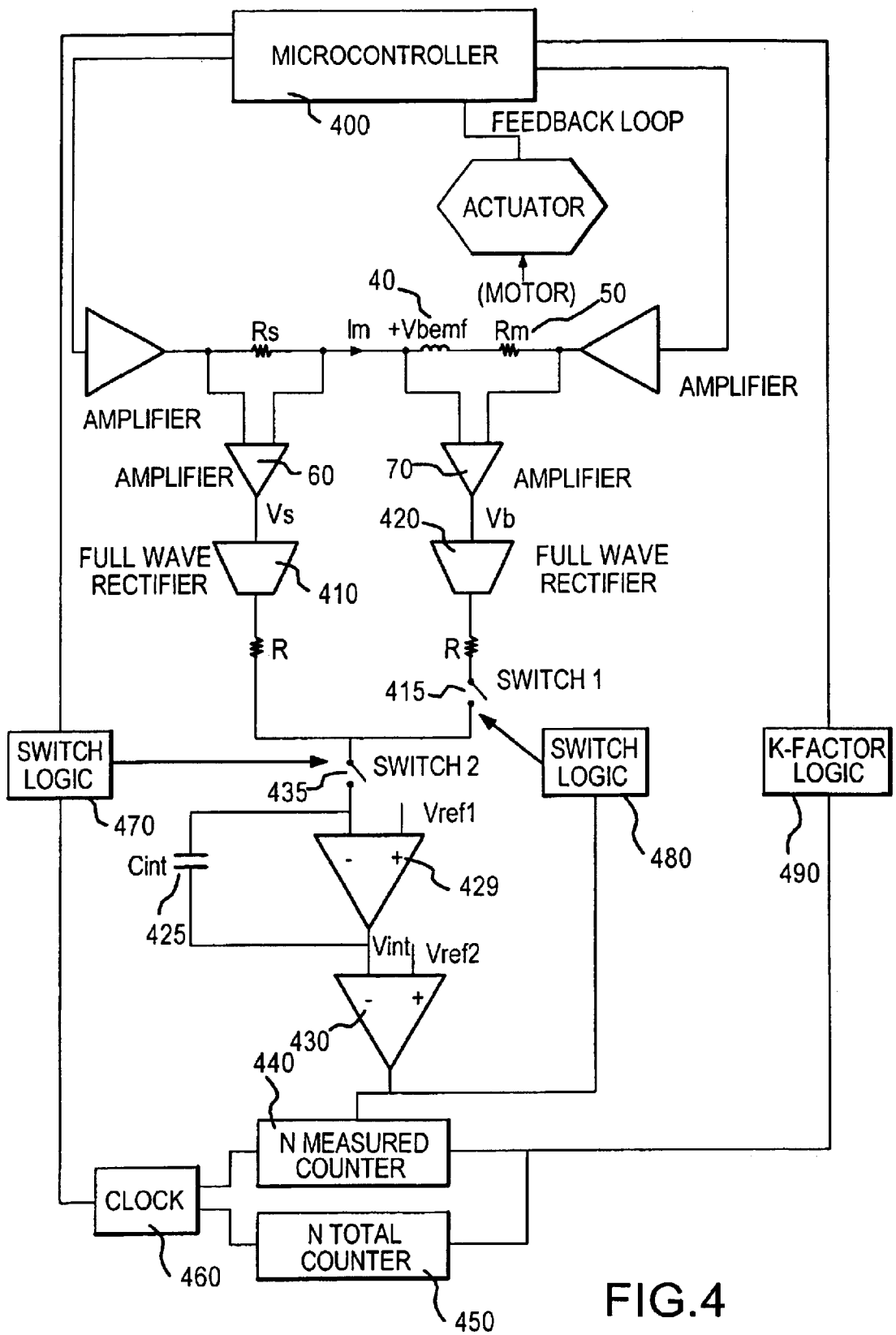
FIG. 4 shows a continuous auto-calibration system that uses a sigma-delta modulation technique for calculating a K-value that cancels the effect of the resistance in a voice-coil motor.

FIG. 4 illustrates details of an exemplary sigma-delta calibration circuit in accordance with an embodiment of the present invention. In one embodiment, the output of sense amplifier 60 (Vs) and the output of back electromagnetic force amplifier 70 (Vb) are fed to an integrator 429. The respective outputs may be expressed as follows:

$$Vs = Vref + Vsr$$

$$Vb = Vref - Vbr$$

Within the context of the present invention, Vref is defined as the value read from integrator 429 without an applied signal. Vs is the voltage output from op-amp 60, which is an amplification of the voltage across the sense resistor 30. Vb is the voltage output from op-amp 70, which is an amplification of the total of the back electromagnetic voltage 40 for the motor and the voltage across the winding resistance 50. Vsr is the rectified value of the AC component of the voltage across the sense resistor 30 possibly with an associated gain value. Vbr is the rectified value of the AC component of the total of back electromagnetic voltage 40 and voltage across winding resistance 50, which is the total voltage across the motor, possibly with an associated gain value. For the calibration circuit of the present invention to operate as intended, the condition Vsr<Vbr should be maintained.

In one embodiment, during track following time, current flowing through VCM is small. As such, the back EMF voltage produced is also small and the value of Vsr and Vbr are small as well. Vsr and Vbr are small because the current Im is small. Since the motor is a reactive component (having inductance), this condition will influence the settling time of the system. Before the system settles down, it is possible for the condition Vsr<Vbr to be violated. Violation of this condition could possibly cause the sigma-delta calibration system to malfunction. In one aspect of the invention, two full wave rectifiers 410, 420 are provided, one each at the output of the sense amplifier 60 and the output of the Vbemf amplifier 70 to ensure the condition Vsr<Vbr is maintained.

Continuing with the sigma-delta calibration circuit of FIG. 4, the operation of the calibration method may be explained using the following equations. If switch1 415 is initially in the off position or open, Vs will charge capacitor Cint 425. The input Vint_off (Vint measured at the input to comparator 430 when switch1 415 is off) can be expressed using either of the following equations:

$$Vint\_off = Vref - (is/Cint) \cdot toff$$

$$Vint\_off = Vref - (Vsr/Cint.R) \cdot toff$$

Continuing with the example of FIG. 4, at some point during the charging process, Vint becomes less than Vref1. Since Vref1=Vref2, if comparator 430 determines that Vint is less than Vref2, switch1 415 turns on, or closes, and the capacitor Cint is discharged by Vb. The output of the integrator Vint_on (Vint measured at the input to comparator 430 when switch1 415 is on) can be expressed using either of the following equations:

$$Vint\_on = Vref + \{(ib-is)/Cint\} \cdot ton$$

$$Vint\_on = Vref + \{(Vbr/Cint.R) - (Vsr/Cint.R)\} \cdot ton$$

Since |ΔVint off|=|ΔVint on| when Cint is completely discharged, Vsr/Vbr=ton/ttotal. If a clock of period Tclk is used to time the charging and discharging time, ton represents Nmeasured·Tclk and ttotal represents Ntotal·Tclk. Nmeasured is therefore defined as the duration of time in terms of clock counts that switch1 415 is turned on or closed and Ntotal is defined as the duration of time in terms of clock counts for the entire calibration process.

The ratio between Rs and Rm, and therefore the multiplying K factor, can be determined by the ratio between Nmeasured and Ntotal. The following determines such a ratio. From above, Vsr/Vbr=Nmeasured/Ntotal. Since Vsr and Vbr can be mathematically replaced, Rs/Rm=Nmeasured/Ntotal. Therefore K factor=Nmeasured/Ntotal. Ntotal is a pre-determined value used to set the resolution of the sigma-delta calibration system and is set into counter 450. Nmeasured is an unknown parameter that is extracted from the system by means of a counter 440.

With reference to FIG. 4, a signal may be provided by the microcontroller 400 to indicate if the hard disk drive (HDD) is in seeking or track-following mode. When the HDD is in track-following mode, switch2 435 is closed and the clock 460 is enabled by switch logic 470. The sigma-delta calibration system performs calibration. When the HDD is in seeking mode, switch2 435 is opened and the clock is stopped. Opening switch2 435 preserves the magnitude of charge that is stored in the capacitor Cint prior to entering seeking mode. The Ntotal counter 450 and Nmeasured counter 440 will cease counting because the clock is stopped. The Ntotal and Nmeasured values will be maintained that were existing prior to entering seeking mode.

When the HDD begins its next track-following mode, switch2 435 will close, the clock will enable, and Ntotal counter 450 and Nmeasured counter 440 will resume counting. As such, the sigma-delta calibration system will resume its calibration. The above-mentioned activities will repeat continuously until the preprogrammed value of Ntotal expires. At this point, the K-factor logic will process the Ntotal and the final Nmeasured and derive the ratio between Rs and Rm. The result is passed to microcontroller 400.

Figure 5A:
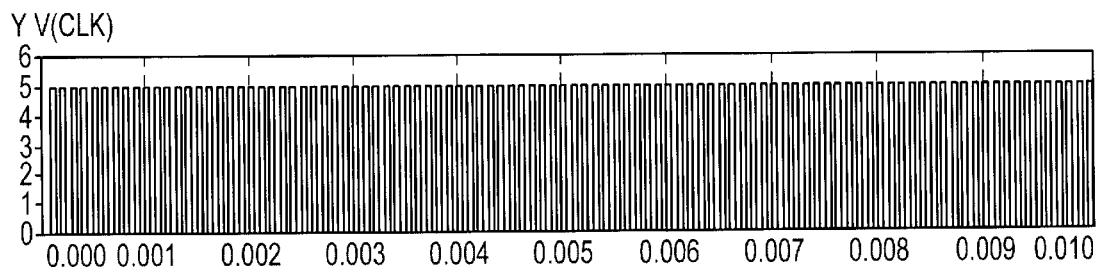
FIGS. 5A–5C illustrate one example of an automatic calibration procedure.
Figure 5B:
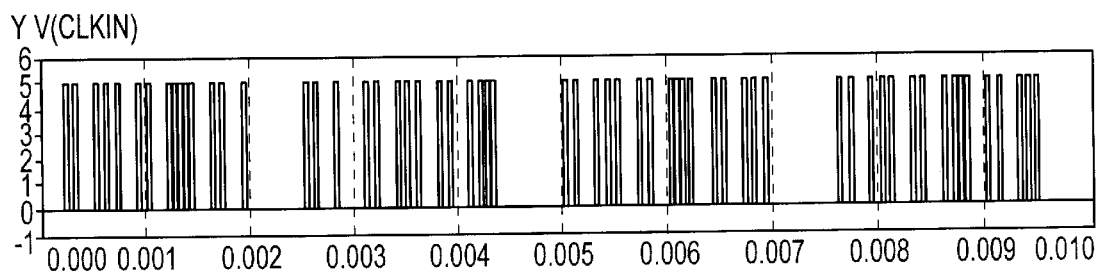
Figure 5C:
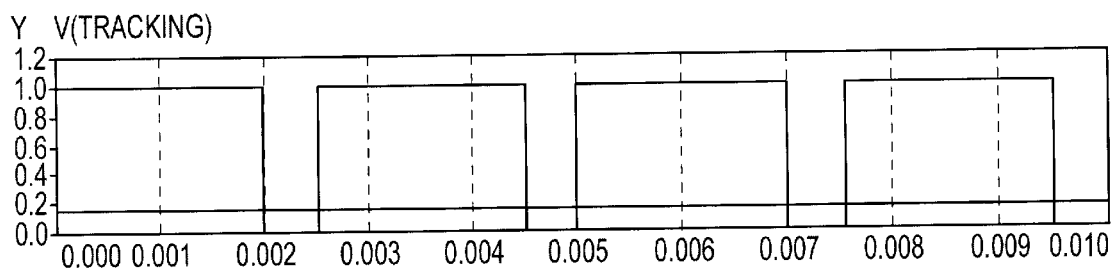

FIGS. 5A–5C illustrate one example of a sigma-delta automatic calibration operation. Taking into consideration that K factor=Nmeasured/Ntotal, the operation calculates a value for both Nmeasured and Ntotal. In the illustrated embodiment, the total sample count, Ntotal, is set at 80. A clock signal is shown in wave form in FIG. 5A as V(CLK). Continuing with the illustrated example, FIG. 5B shows the wave pattern for Nmeasured, depicted as V(CLKIN). Nmeasured and Ntotal are counted during track following time, depicted in FIG. 5C as V(TRACKING).

In the illustrated example, V(TRACKING) is set to 20 clock counts. Therefore, Nmeasured is determined during the 20 clock cycles. Since Ntotal is set to 80 total clock cycles, 4 periods of V(TRACKING) are necessary to determine Nmeasured. The sigma-delta calibration system samples for the first 20 clock counts and records the Nmeasured1. Then, the system waits for the next track-following period, conducts sampling the next 20 clock counts and adds Nmeasured2 to Nmeasured1. The operation continues until the pre-determined total sample count of 80 is reached. In the illustrated example, Nmeasured=Nmeasured1+Nmeasured2+Nmeasured3+Nmeasured4.

Figure 6A:
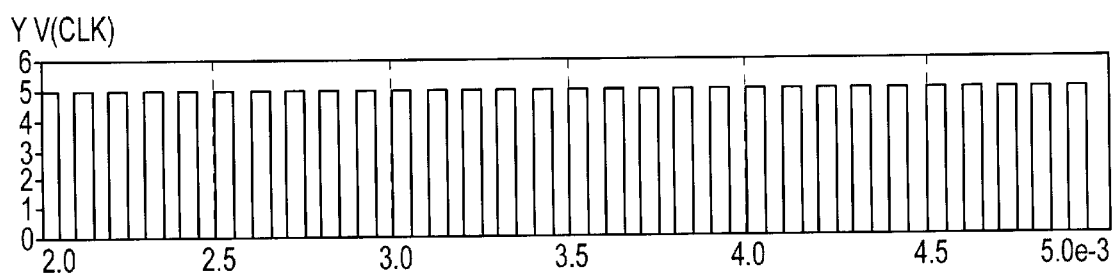
FIGS. 6A and 6B illustrate an expanded view of the wave forms of FIGS. 5A and 5B.
Figure 6B:
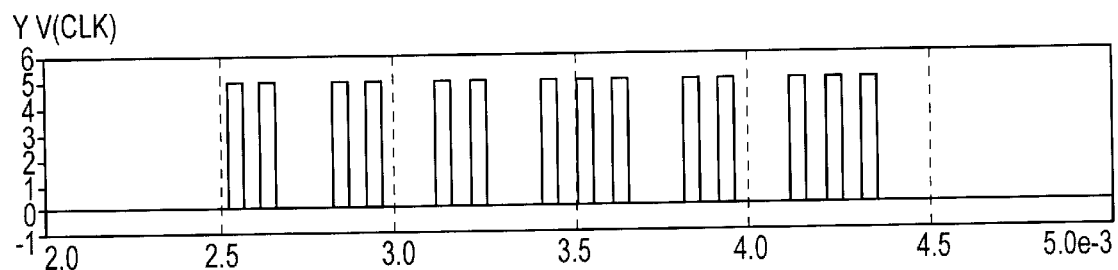

Continuing with the illustrated example, Ntotal=80 and Nmeasured=60. From one calculation of K factor, K factor=Rs/Rm=Nmeasured/Ntotal=0.75. Assuming the fact that the inputs to the sigma-delta calibration circuit are Vsr=0.7V and Vbr=1.0V respectively, the theoretical ratio is Rs/Rm=0.7. The K factor determined from the operation of the calibration circuit differs from the theoretical ratio by approximately +7%. However, setting Ntotal to a larger value may reduce this error. FIGS. 6A and 6B show an expanded view of a few clock cycles for Nmeasured and Ntotal for one track-following period.

There are no restrictions to the number of sampling count per track-following period. The longer the track-following period means that the sigma-delta calibration system can sample more counts per period. This will result to a shorter total calibration time. The sigma-delta calibration system is capable of using multiple tracking-following periods to complete a full calibration.

In an HDD system, the actuator is continuously performing track following or seeking. The time spent on track following is a variable amount of time that is completely dependent on the individual users. So as to not to interrupt the activities of the HDD, the sigma-delta calibration system is capable of performing a calibration operation in-between seeking time for a predetermined number of clock cycles and still providing an accurate K value.

The advantage of the sigma-delta calibration method described herein is that the calibration is performed during track-following time, where the back EMF voltage developed in the voice-coil-motor is negligible. In addition, the calibration process works well with the firmware of the HDD because the sigma-delta calibration system is capable of performing calibration over many track-following cycles and can manage interrupts from seeking periods. The K value is updated automatically without additional firmware, being transparent to the firmware. With the implementation of the sigma-delta calibration system, the HDD will always have the most up-to-date Rs/Rm ratio.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of providing a continuous auto-calibration circuit in a hard disk drive system comprising:

setting a first time duration, wherein the first time duration is a length of time in terms of clock counts for a calibration procedure;

measuring a second time duration during the first time duration, wherein the second time duration is a length of time in terms of clock counts that a counter is operational;

determining a multiplying factor by dividing the first time duration by the second time duration; and supplying the multiplying factor to a controller in communication with the hard disk drive.

2. The method of claim 1 wherein the first and second time duration are enabled during a disk drive track following mode and are paused during a disk drive seeking mode.

3. The method of claim 1 wherein the first time duration is a predetermined total sample count for a sigma-delta calibration operation.

4. The method of claim 1 wherein the second time duration is the duration of time that a switch in the calibration circuit is closed thereby operating the counter.

5. The method of claim 1 further comprising the step of stopping the calibration procedure when the first time duration expires and thereafter determining the multiplying factor.

6. A continuous auto-calibration circuit in a ramp-loading circuit implemented within a disk drive system comprising:

a voltage mode driver coupled to a load, wherein the voltage mode driver generates a drive signal;

a processor coupled to the voltage mode driver, the processor configured to generate a drive command indicating a voltage level output from the voltage mode driver;

a first amplifier for receiving a voltage associated with a sense resistor;

a second amplifier for receiving a back electromagnetic voltage associated with a motor;

an integrator coupled to the first sense amplifier and the second amplifier;

a first switch coupled to the second sense amplifier, wherein the switch operates in response to the output of the integrator; and a counter coupled to the integrator for measuring the duration that the first switch is turned on.

7. The auto-calibration circuit of claim 6, further comprising a second switch coupled to the first amplifier and the second amplifier, wherein the second switch operates between a seeking mode and a track following mode of the disk drive system.

8. The auto-calibration circuit of claim 7, wherein the second switch is open when the disk drive system is in seeking mode and the second switch is closed when the disk drive system is in track following mode.

9. The auto-calibration circuit of claim 7, further comprising a first full wave rectifier coupled to the first amplifier and a second full wave rectifier coupled to the second amplifier, wherein the first and second full wave rectifiers ensure the AC voltage component across the sense resistor is less than the AC voltage component across the motor.

10. The auto-calibration circuit of claim 7 further comprising a capacitor coupled to the first and second amplifier, wherein the capacitor charges when the first switch is open.

11. The auto-calibration circuit of claim 10 wherein the capacitor is charged by the output of the first amplifier.

12. The auto-calibration circuit of claim 10, wherein the capacitor discharges when the first switch closes, wherein the first switch closes when the capacitor voltage is less than a reference voltage from the integrator.

13. A disk drive system comprising:

a disk having a surface capable of storing data;

a read/write head configured to read and write data to specified locations of the disk surface;

a voice coil motor coupled to the read write head and responsive to a drive signal to position the read/write head at the specified locations;

a voltage mode driver coupled to receive commands and generate the drive signal to the voice coil motor;

a system processor configured to generate commands indicating a desired programmed drive signal to the voltage mode driver;

a first amplifier for receiving a voltage associated with a sense resistor;

a second amplifier for receiving a back electromagnetic voltage associated with a motor;

an integrator coupled to the first sense amplifier and the second amplifier;

a first switch coupled to the second sense amplifier, wherein the switch operates in response to the output of the integrator; and a counter coupled to a comparator for measuring the duration that the first switch is turned on.

14. The disk drive system of claim 13, further comprising a second switch coupled to the first amplifier and the second amplifier, wherein the second switch operates between a seeking mode and a track following mode of the disk drive system.

15. The disk drive system of claim 14, wherein the second switch is open when the disk drive system is in seeking mode and the second switch is closed when the disk drive system is in track following mode.

16. The disk drive system of claim 13, further comprising a first full wave rectifier coupled to the first amplifier and a second full wave rectifier coupled to the second amplifier, wherein the first and second full wave rectifiers make certain that the AC voltage component across the sense resistor is less than the AC voltage component across the motor.

17. A method of calculating a multiplying factor for a voltage control loop (VCL) of a ramp loading circuit in a hard disk drive, the method comprising:

providing a first amplifier for receiving a first voltage associated with a sense resistor;

providing a second amplifier for receiving a second voltage associated with a motor;

providing an integrator for receiving the output of the first and second amplifier;

providing a first switch that is in an off position while the output of the sense amplifier charges a capacitor and is in an on position when the voltage associated with the capacitor exceeds a reference voltage associated with the integrator;

incrementing a first counter for each time increment that the switch is in an on position;

setting a second counter to a predetermined time duration;

operating the first counter for the time duration contained on the second counter; and calculating the multiplying factor when the second counter expires, wherein the multiplying factor is determined by dividing the time duration of first counter by the time duration of the second counter.

18. The method of claim 17 further comprising the act of providing a second switch that operates when the disk drive is in a seeking or track following mode, wherein the second switch is closed in the track following mode and open in the seeking mode.

19. The method of claim 17 further comprising the act of providing a first full wave rectifier coupled to the first amplifier and a second full wave rectifier coupled to the second amplifier.

20. The method of claim 17 further comprising:

providing a signal to indicate whether the hard disk drive is in seeking or track following mode; and opening or closing a second switch in response to the signal.

* * * * *